US005520141A

United States Patent [19]

Lutz

[11] Patent Number: 5,520,141

[45] Date of Patent: May 28, 1996

[54] DEMOUNTABLE FLAGSTAFF BRACKET

[76] Inventor: Robert E. Lutz, 285 Hazelton Ct., Morgan Hill, Calif. 95037

[21] Appl. No.: 259,234

[22] Filed: Jun. 13, 1994

[51] Int. Cl.[6] .......................... G09F 17/00; F16M 13/00; F16C 11/00

[52] U.S. Cl. .......................... 116/173; 248/514; 403/93; 40/606

[58] Field of Search .......................... 116/173–175; 248/160, 225.31, 291, 299, 514, 520, 539, 540; 403/92–94, 96, 101, 83, 84; 40/606; 24/455–457

[56] References Cited

U.S. PATENT DOCUMENTS

| | | | |
|---|---|---|---|
| 923,596 | 6/1909 | Staples | 248/540 |
| 1,575,040 | 3/1926 | Crum . | |
| 1,597,266 | 8/1926 | Dearman | 248/225.31 |
| 1,765,245 | 6/1930 | Scott | 116/173 |
| 2,257,350 | 9/1941 | Siebert et al. | 403/94 |
| 2,697,776 | 12/1954 | Wale | 248/291 |
| 2,799,240 | 9/1957 | Andrews . | |
| 3,051,422 | 8/1962 | Crump et al. | 248/518 |
| 3,183,886 | 5/1965 | Moffitt . | |
| 3,191,898 | 6/1965 | McCollough | 248/514 |
| 3,595,202 | 7/1971 | Visitacion . | |
| 3,926,139 | 12/1975 | Sabin . | |
| 4,122,796 | 10/1978 | Pressler et al. | 116/173 |
| 4,478,169 | 10/1984 | Shrefler | 116/173 |
| 4,505,010 | 3/1985 | Arenhold | 24/456 |
| 4,864,962 | 9/1989 | Kuehl et al. . | |
| 5,044,301 | 9/1991 | Peters et al. . | |

*Primary Examiner*—William A. Cuchlinski, Jr.
*Assistant Examiner*—Andrew Hirshfeld
*Attorney, Agent, or Firm*—Robert Samuel Smith

[57] ABSTRACT

A bracket for supporting a flagstaff in several orientations and useful particularly in situations where it is required to quickly raise or lower the flag such as to signal presence of a water skier down in the water and dismounting when it is desired to store the flag when not in use, the bracket including a bar with a hole for insertion of the end of the flagstaff and rotatably mounted on a panel with notches around an edge each of which engages a spring loaded catch on the bar when it is rotated in a corresponding orientation. In one embodiment, the panel is a side panel of a channel and the joining leg of the panel slides into a slot in a bar bolted to a base such as the side of a boat.

4 Claims, 3 Drawing Sheets

DEMOUNTABLE FLAGSTAFF BRACKET

FIELD OF THE INVENTION

This invention relates to a device for hoisting a flag and particularly to a device which is demountable such as from a side of a boat when it is desired to store the flag.

BACKGROUND

Flags have been used for generations as a means for signalling, particularly in situations related to the sea. For example, they have been used to signal expected weather conditions, distress, country of origin, etc. One application involving: the use of flags is in connection with water skiing in which a skier is pulled by a boat. When the skier goes down in the water, a person in the boat raises a flag as the boat circles to signal to other boats that a skier is down in the water and that the other boats should be on the lookout to avoid colliding with the downed skier.

Various devices have been disclosed for hoisting, unfurling and securing flags to flagstaffs.

For example, U.S. Pat. No. 3,183,886 to Moffitt is for a wire arrangement to attach the edge of the flag to a flagstaff.

U.S. Pat. No. 1,597,266 to Dearman is for a flag holder permanently mounted on the mud guard of an automobile. The flagstaff can be positioned at several fixed locations but is not designed for quick raising and lowering.

U.S. Pat. No. 3,926,139 to Sabin is for a flag unfurled from a sailing boom.

U.S. Pat. No. 5,044,301 to Peters et al is for unfurling a flag and maintaining the flag in an unfurled state.

U.S. Pat. No. 3,595,202 to Visitacion is for a flagstaff which is constructed to prevent winding of the flag around the flagstaff.

U.S. Pat. No. 1,575,040 to Cram is for a flagstaff with telescoping members.

U.S. Pat. No. 4,864,962 to Kuchl and Falcone is for a combination flagpole and bracket wherein an end of the flagpole is hinged and capable of being fixed in several orientations by a wing screw insertable in a selected hole. The construction is not constructed for fast hoisting or lowering.

U.S. Pat. No. 2,799,240 is for a device for attaching a flag to a flagpole including a roller bearing mounting that turns so as to prevent the flag from winding around the flagstaff Other attaching devices are disclosed such as U.S. Pat. No. 1,110,857 which discloses an arrangement for a vehicle curtain.

None of the disclosed devices provide the capability to quickly raise and lower the flag to any one of several orientations nor for quickly detaching the flagstaff and bracket for mounting such as when it is desired to stow the flag.

THE INVENTION

Objects

It is an object of this invention to provide a holder for a flag that permits hoisting or lowering the flag in less than a second.

It is another object that the holder be detachably attachable from a base such as when it is required to stow the flag.

It is another object that the device be inexpensive.

It is another object that the flagstaff be firmly securable at several orientations with respect to the vertical.

SUMMARY

This device is directed toward a socket member pivotally mounted onto the outside surface of a side panel of a channel member. The socket member receivingly engages the end of a flag staff. A strap is also rotatably mounted with the socket member and engages the socket member. The flag staff may be oriented to any one of several positions and fixed in that position by engagement of the strap with an adjacent notch in the leg of the channel. The strap and socket member are released from the notch by pressing an end tab on the strap so as to flex the strap and disengage the strap from the notch. The channel is attachably detached to a base such as the side of a boat by a block which has a slot and is secured to a side of the boat. The joining (center) panel of the channel is slid into the slot when it is desired to maintain the flag in position for quick raising or lowering.

In another embodiment, an end of the flagstaff is permanently mounted on a panel to rotate about an axis perpendicular to the panel and flagstaff. A spring loaded sleeve slidably mounted on the flagstaff engages an appropriate notch on the edge of the panel to maintain orientation of the flagstaff.

DESCRIPTION OF A PREFERRED EMBODIMENT

Figure 1:
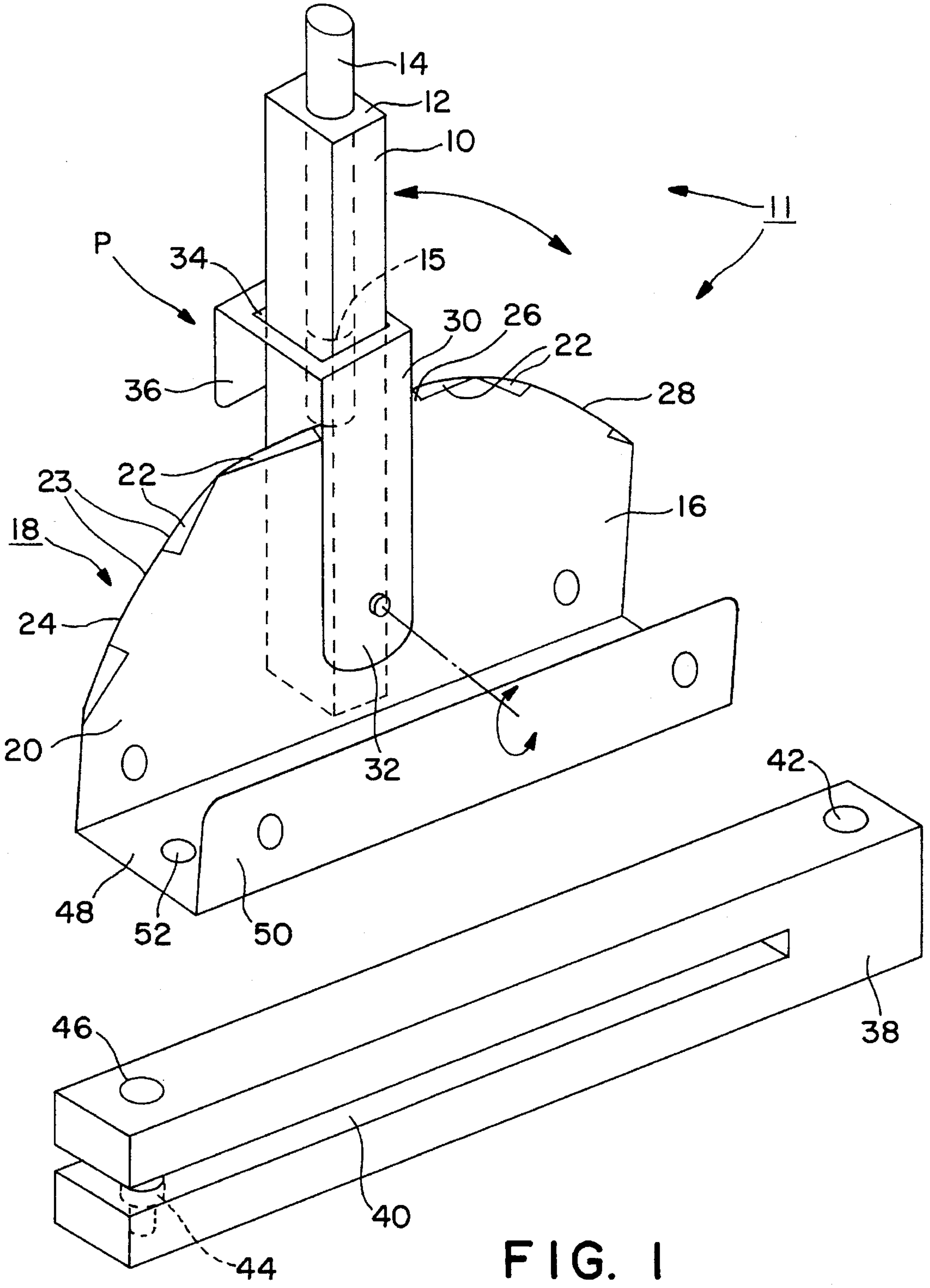
FIG. 1 shows the demountable bracket and attachment/detachment bar.

Turning now to a discussion of the drawings, FIG. 1 shows the demountable flag staff bracket 11 of this invention having an elongated bar 10 with an opening 12 on a first end to receive a flagstaff 14. The elongated bar 10 is transversely rotatably mounted on a side panel 20 of channel 18. Channel 18 includes side panels 20 and 50 joined by joining panel 48. A spring strap 30 is mounted near one end 32 to rotate with bar 10 which protrudes through aperture 34. Side panel 20 has an outer edge 23 with tabs 22 folded over away from panel 20 to form a plurality of notches. Three notches are shown 24, 26 and 28, with strap 30 engaging notch 26. Strap 30 has a tab 36 adjacent to the aperture 34. When it is desired to rotate the flagstaff, tab 36 is depressed thereby disengaging strap 30 from the notch and permitting free rotation of the flagstaff.

FIG. 1 also shows a bar 38 for detachably attaching the bracket 11 to a base such as the side of a boat (base not shown). The bar 38 is bolted to the side of the boat through bolt holes 42 and 44. Hole 46 is a clearance hole for inserting a bolt (or fastener) into hole 44. The bar 38 has a slot 40 providing that, when the bar is bolted to the side of the boat through 42 and 44, the joining panel is slid into the slot 40 thereby detachably attaching the bracket 11 to the base.

The second side panel 50 is shown which further secures the channel 18 in its position in the slot 40.

An important feature of this invention is a design which enables stamping the channel out of sheet metal such as sheet steel, 0.050 inches thick. Other embodiments may be considered which are within the scope of this invention.

Figure 2:
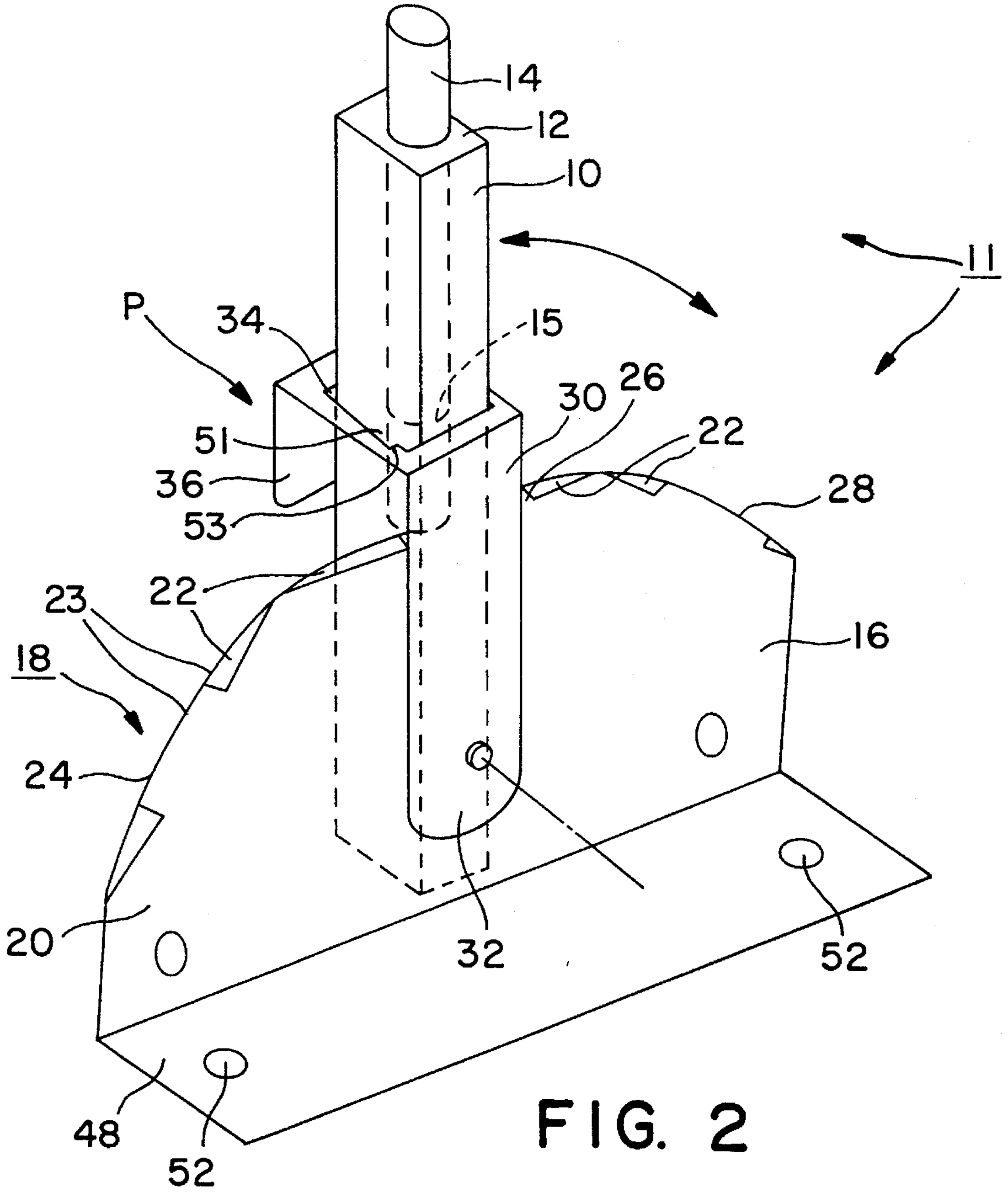
FIG. 2 shows a second arrangement for attaching the bracket to a base.

For example as shown in FIG. 2, the second side panel 50 could be eliminated and the bracket could be permanently bolted by bolt holes 52 (one is shown in FIG. 1) to the side of the boat.

FIG. 2 also shows a slot 51 in bar 10 and there is a notch 15 in flagstaff 14 such that edge 53 of aperture 34 in spring strap 30 engages the notch in the flagstaff through slot 51 in bar 10 and secures flagstaff 14 in the hole in bar 10.

Figure 3:
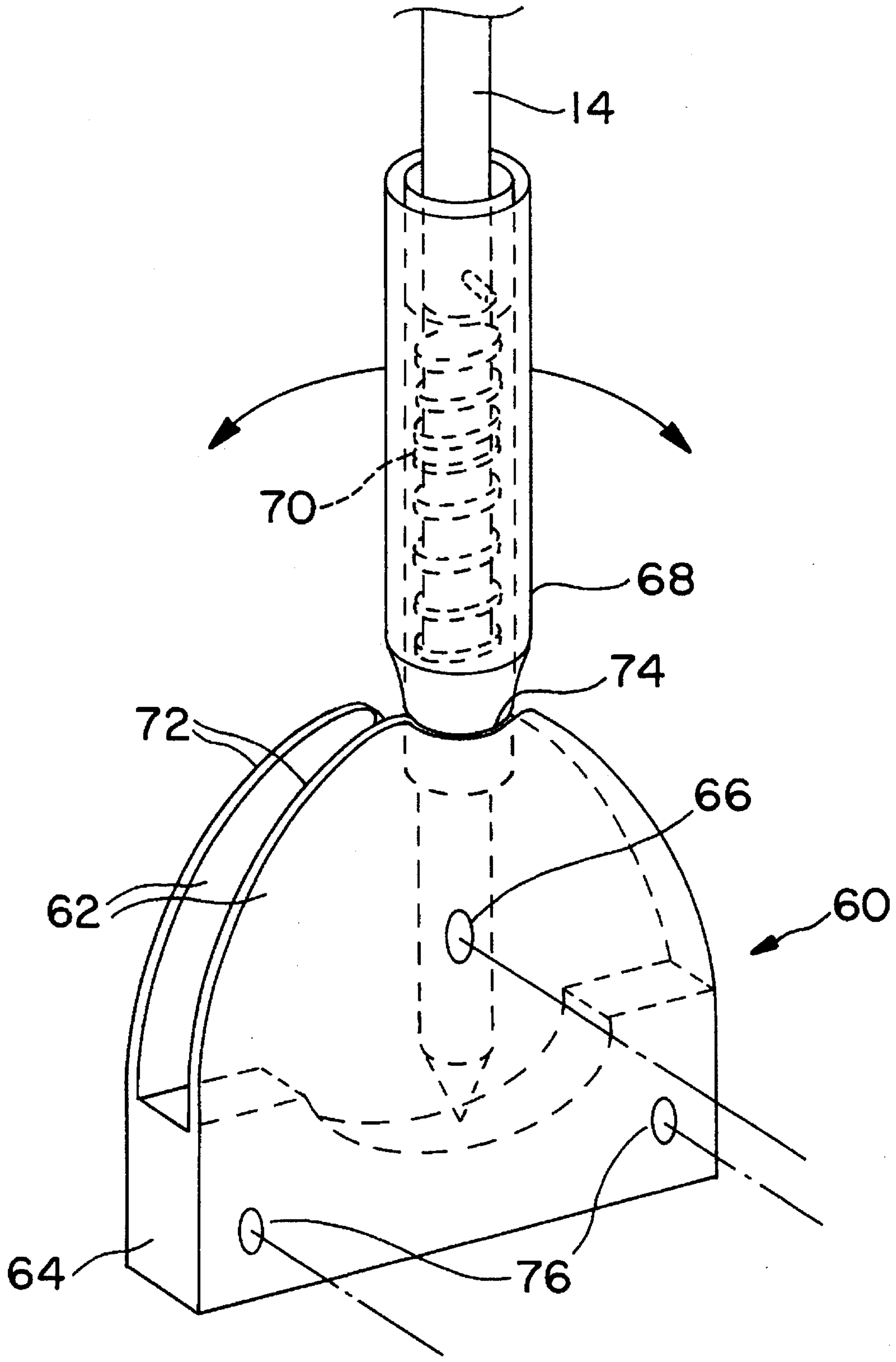
FIG. 3 shows another embodiment of the invention.

FIG. 3 shows an embodiment including a channel having side panels 62 joined by a joining member 64. The flagstaff 14 is permanently and rotatably secured in the channel by pin 66. A sleeve 68 is slidably mounted on flagstaff 14. Spring 70 biases sleeve 68 to slide into contact with edges 72 of panels 62 and engage notch 74 when the flagstaff 14 is rotated to a vertical position so that flagstaff 14 is detachably secured in the vertical position. Mounting holes 76 are shown in the base 64 for securing the device to an appropriate wall.

Various uses of the bracket include supporting a flag on a boat or a raft such as are used by scuba divers, supporting flags on utility vehicles used in construction along highways, as a signalling means at various sporting events and for supporting a radio antenna.

In view of other modifications that may be considered after studying the drawings and reading the specification that are within the scope of this invention, I therefore wish to define the scope of my invention by the appended claims.

I claim:

1. A bracket for supporting a flagstaff in a plurality of orientations which comprises:

a joining member having means adapted for attaching said joining member to a base;

a first side panel secured to said joining member along a first edge of said first side panel such that said first sidepanel extends away from said joining member;

an elongated first bar having an elongated hole with an opening in a first end of said bar and extending toward a second end of said bar, said hole adapted for receivingly engaging an end of said flagstaff;

said first bar rotatably mounted at a location on said first side panel to rotate about an axis of rotation;

said axis of rotation being perpendicular to said bar: said first side panel having a second edge opposite said first edge;

a plurality of tabs in said side panel attached along said second edge;

said plurality of tabs operably folded away from said first side panel to form a plurality of first notches spaced from one another along said second edge of said first side panel, each of said plurality of first notches being between adjacent tabs of said plurality of folded tabs;

a strap having a first end rotatably mounted to rotate about said axis of rotation;

said axis being perpendicular to a surface of said strap;

a strap leg extending from a second end of said strap and substantially perpendicular to said strap and an aperture through said strap leg such that said first bar extends through said aperture;

said strap with aperture in said strap leg and plurality of first notches all arranged in operable combination with one another such that when said first bar is oriented in any one of a plurality of positions, said strap engages one of said notches along said second edge of said first side panel respectively and when it is required to reorient said first bar to another orientation, said strap is adapted for being forced out of engagement with said one of said notches such as to permit rotation of said first bar and said strap.

2. A bracket as in claim 1 comprising said end of said flagstaff adapted for being inserted into said elongated hole in said bar;

said flagstaff having a second notch proximal to said end of said flagstaff;

said bar having a slot;

said aperture having an edge arranged in operable combination with said slot in said bar and said second notch in said flagstaff such that said edge of said aperture engages said second notch and said slot when said flagstaff is oriented in one of said plurality of orientations.

3. A bracket as in claim 1 wherein said joining member is a joining panel having an edge joined perpendicularly to said first edge of said first side panel; said means adapted for attaching are holes in said joining panel adapted for securing said joining panel against said base with fasteners through said holes.

4. A bracket as in claim 3 wherein joining member comprises:

a second side panel joined to said joining panel such that said first and second side panels and said joining panel form a channel;

a second elongated bar having a slot extending from a first end of said second elongated bar toward a second end of said second elongated bar;

said second elongated bar having holes for engaging fasteners;

said second elongated bar adapted in operable combination with said slot, said holes in said second elongated bar, and the rest of said bracket such that, when said second elongated bar is secured to the base by fasteners through said holes in said joining panel and said second elongated bar, said slot is enabled to receivingly engage said joining panel thereby supporting said bracket with said first panel extending in a direction away from said base.

* * * * *